US012569890B2

(12) United States Patent
Jin et al.

(10) Patent No.: US 12,569,890 B2
(45) Date of Patent: Mar. 10, 2026

(54) LIQUID STORAGE TANKS AND CLEANERS INCLUDING THE SAME

(71) Applicant: TCL ZHONGHUAN RENEWABLE ENERGY TECHNOLOGY CO., LTD., Tianjin (CN)

(72) Inventors: Lihui Jin, Tianjin (CN); Hua Yang, Tianjin (CN); Zhigao Ren, Tianjin (CN); Huan Wang, Tianjin (CN); Liang Ren, Tianjin (CN); Chuanling Ai, Tianjin (CN); Dawei Wang, Tianjin (CN); Zhijun Wu, Tianjin (CN); Hongxia Cen, Tianjin (CN); Chen Wei, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 216 days.

(21) Appl. No.: 18/548,088

(22) PCT Filed: Jul. 31, 2023

(86) PCT No.: PCT/CN2023/110435
§ 371 (c)(1),
(2) Date: Aug. 26, 2023

(87) PCT Pub. No.: WO2023/241733
PCT Pub. Date: Dec. 21, 2023

(65) Prior Publication Data

US 2025/0033096 A1 Jan. 30, 2025

(30) Foreign Application Priority Data

Jun. 14, 2022 (CN) ......................... 202210667902.5

(51) Int. Cl.
*B08B 3/10* (2006.01)
*B08B 3/04* (2006.01)

(52) U.S. Cl.
CPC ................ *B08B 3/10* (2013.01); *B08B 3/048* (2013.01); *B08B 2203/007* (2013.01)

(58) Field of Classification Search
CPC ................ B08B 3/10; B08B 2203/007; H01L 21/67017; H01L 21/67023; H01L 21/6704;

(Continued)

(56) References Cited

U.S. PATENT DOCUMENTS 3,049,136 A * 8/1962 Van Scoyk ......... A47L 15/4285 392/394
5,341,825 A 8/1994 Kobayashi
2023/0077617 A1* 3/2023 Furuya ................ H01L 21/6708 156/345.11

FOREIGN PATENT DOCUMENTS

CN 203218224 U 9/2013
CN 106950731 A 7/2017

(Continued)

OTHER PUBLICATIONS

International Search Report in International application No. PCT/CN2023/110435, mailed on Sep. 15, 2023.

(Continued)

*Primary Examiner* — David G Cormier
(74) *Attorney, Agent, or Firm* — PV IP PC; Christopher S. Ruprecht; Wei Te Chung

(57) ABSTRACT

A liquid storage tank may include a body with an inner cavity, wherein a first liquid storage area and a second liquid storage area are provided in the body, and a partition is provided between the first liquid storage area and the second liquid storage area. A heater for heating solution is provided (Continued)

in the first liquid storage area. A liquid outlet is provided in the second liquid storage area.

15 Claims, 3 Drawing Sheets

(58) Field of Classification Search
CPC ......... H01L 21/67051; H01L 21/67057; H01L 21/67098; H01L 21/67248; A47L 15/4285; A47L 15/428
See application file for complete search history.

(56) References Cited

FOREIGN PATENT DOCUMENTS

| | | | |
|---|---|---|---|
| CN | 209565319 | U | 11/2019 |
| CN | 210204509 | U | 3/2020 |
| CN | 214012914 | U | 8/2021 |
| CN | 215785293 | U | 2/2022 |
| CN | 217393147 | U | 9/2022 |
| JP | H03108717 | A | 5/1991 |

OTHER PUBLICATIONS

Written Opinion of the International Search Authority in International application No. PCT/CN2023/110435, mailed on Sep. 15, 2023.

* cited by examiner

LIQUID STORAGE TANKS AND CLEANERS INCLUDING THE SAME

CROSS-REFERENCE TO RELATED APPLICATION

The present disclosure claims priority to and the benefit of Chinese Patent Application No. 202210667902.5, filed on Jun. 14, 2022, the disclosure of which is incorporated herein by reference in its entirety.

TECHNICAL FIELD

The present disclosure relates to auxiliary equipment for cleaning, and in particular, to liquid storage tanks for cleaning silicon wafers and cleaners provided with the liquid storage tanks.

BACKGROUND

Cleaning silicon wafers is one of the important processes in machining silicon wafers. In the cleaning process, there is a process called quick-discharge cleaning, that is, it is necessary to quickly spray solution with a certain temperature into a cleaning tank within 1 second to 2 seconds for defoaming, and to continuously overflow to change water in the cleaning tank at the same time. The existing water storage tank has only one inner cavity, in which heating and storing water are carried out at the same time. When spraying and overflowing are performed synchronously, solution in the water storage tank is quickly discharged, resulting in dry burning of a heater, and sometimes causing overflowing water-break, which not only causes a safety risk but also affects cleaning effect of silicon wafers.

SUMMARY

In view of the above, an embodiment of the present disclosure provides a liquid storage tank, which include a body with an inner cavity, wherein a first liquid storage area and a second liquid storage area are provided in the body, and a partition is provided between the first liquid storage area and the second liquid storage area; a heater for heating solution is provided in the first liquid storage area; and a liquid outlet is provided in the second liquid storage area.

In some embodiments of the present disclosure, the first heater is arranged at an end of the first liquid storage area and inserted into the first liquid storage area.

In some embodiments of the present disclosure, a second heater is provided in the second liquid storage area, and the first heater and the second heater are arranged on a same end surface of the body.

In some embodiments of the present disclosure, the first heater includes a plurality of first heating tubes, and the second heater includes a plurality of second heating tubes more than the plurality of first heating tubes; each of the first heater and the second heaters is positioned lower than a height of the partition; and the height of the partition is lower than a height of a wall surface of the body.

In some embodiments of the present disclosure, a first liquid level control and a second liquid level control are provided respectively in the first liquid storage area and the second liquid storage area; a height of the first liquid level control is higher than a height of the first heater and lower than a height of the partition; and a height of the second liquid level control is higher than a height of the second heater and lower than the height of the partition.

In some embodiments of the present disclosure, a first liquid inlet and a first liquid outlet are provided in the first liquid storage area and located at a lower end surface of the body, and a diameter of the first liquid inlet is larger than that of the first liquid outlet.

In some embodiments of the present disclosure, the one or more liquid outlets in the second liquid storage area include a second liquid outlet and a third liquid outlet each located on a lower bottom surface of the second liquid storage area; and a height of the second liquid outlet is lower than a height of the third liquid outlet in an inner cavity of the second liquid storage area.

In some embodiments of the present disclosure, a third liquid storage area is further provided at an end of the body away from the first heater; the third liquid storage area is provided across respective widths of the first liquid storage area and the second liquid storage area, and is connected with the first liquid storage area and the second liquid storage through a connecting plate; and a height of the connecting plate is higher than the height of the partition.

In some embodiments of the present disclosure, a liquid outlet is provided on each of a lower bottom surface and a side wall surface of the third liquid storage area.

An embodiment of the present disclosure further provides a cleaner equipped with the above-mentioned liquid storage tank.

List of reference signs:

| | | |
|---|---|---|
| 100: Liquid storage tank; | 10: Body; | 11: Partition; |
| 20: First liquid storage area; | 21: Heater; | 22: Mounting hole; |
| 23: Liquid level control; | 24: Liquid inlet; | 25: First liquid outlet; |
| 30: Second liquid storage area; | 31: Second liquid outlet; | 32: Third liquid outlet; |
| 40: Third liquid storage area; | 41: Connecting plate; | 42: Fourth liquid outlet; |
| 50: Cap. | | |

DETAILED DESCRIPTION

The present disclosure will now be further described with reference to the accompanying drawings and some embodiments.

Figure 1:
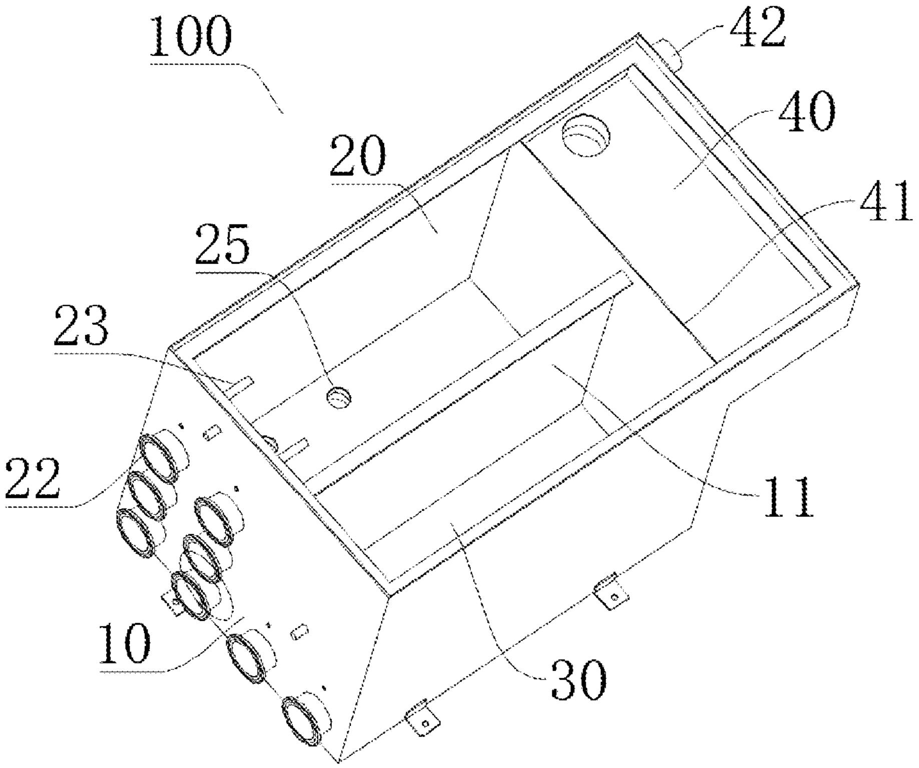
FIG. 1 is a perspective view of a liquid storage tank according to an embodiment of the present disclosure.

This embodiment provides a liquid storage tank 100, as shown in FIG. 1, which includes a body 10 with an inner cavity. The body 10 is internally provided with a first liquid storage area 20 with a heating function and a second liquid storage area 30 capable of quickly supplying water for spraying and overflowing. A partition 11 is provided between the first liquid storage area 20 and the second liquid storage area 30. A heater 21 for heating solution is provided at least in the first liquid storage area 20, and a liquid outlet for discharging solution is provided in the second liquid storage area 30. In the same liquid storage tank 100, two different areas are divided to separate heating and spraying for quickly supplying water. The first liquid storage area 20 keeps storing and heating water without causing dry burning of the heater 21. The second liquid storage area 30 is mainly used for rapid spraying and buffering overflow. When solution is fully filled in the first liquid storage area 20, it will overflow the partition 11 and continue to slowly overflow into the second liquid storage area 30. When the amount of water in the second liquid storage area 30 reaches a state in which water can be rapidly sprayed, spraying is rapidly started and meanwhile overflowing is still carried out. Since the overflow speed is relatively small and the spray speed is relatively large, solution in the second liquid storage area 30 is sufficient to carry out quickly flushing and cleaning the silicon wafers, thus ensuring cleaning quality and cleaning efficiency.

In this embodiment, the body 10 has a cuboid structure, which is not only simple to machine, but also can contain a larger volume of solution compared with other types of structures with the same upper port. Meanwhile, it is easy to divide the areas therein, and each area has sufficient space for inserting the heater 21. Further, there are also sufficient planes to install the heater 21. The partition 11 is provided along a length direction of the body 10, that is, the partition 11 divides the body 10 into the first liquid storage area 20 and the second liquid storage area 30 with cuboid structures. The partition 11 is provided so that the first liquid storage area 20 is always stored with solution. Since the first liquid outlet 25 is open only when solution in the first liquid storage area 20 is cleaned, and the first liquid storage area 20 is always continuously fed with solution without discharging solution, that is, it is always stored with solution. Therefore, the partition 11 can ensure that the phenomenon of dry burning of the heater 21 in the first liquid storage area 20 will not occur.

Figure 2:
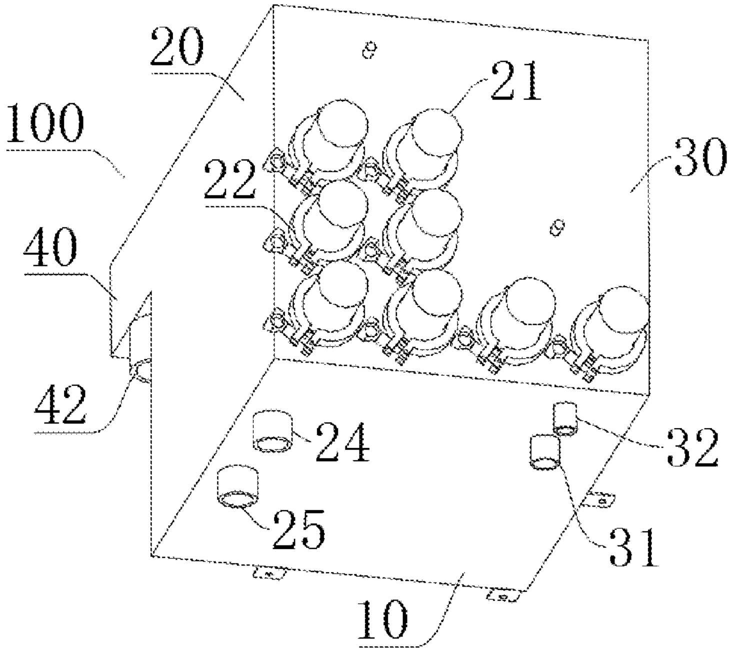
FIG. 2 is a front perspective view of a liquid storage tank.

Further, as shown in FIG. 2, the heater 21 includes a plurality of elongated and independent heating tubes, all of which are provided at an end of the first liquid storage area 20 and inserted into the first liquid storage area 20. Since the heating tube has a relatively long length, the heater 21 needs to be provided along the length direction of the first liquid storage area 20. Since temperature of the first liquid storage area 20 as a heating area changes based on different process requirements, the heating temperature is different, so it is necessary to provide a group of heating tubes at least in the first liquid storage area 20. Several groups of heating tubes provided side by side may also be provided. A plurality of mounting holes 22 are formed at one end of the body 10, and when a plurality of heating tubes need to be provided, the mounting holes 22 can be opened to cooperate with the heating tubes. When there is no need to provide too many heating tubes, part of the mounting holes 22 are blocked, and only part of the mounting holes 22 are opened to cooperate with the heating tubes. It can be based on actual working conditions, which is not specifically limited herein.

Further, for solution in the second liquid storage area 30 for quickly applying water, the temperature of which is reduced during spraying, so it is necessary to heat for a second time. In order to heat solution in the second liquid storage area 30 for a second time, a spare mounting hole 22 in which the heater 21 can be installed is also provided in the second liquid storage area, so as to configure and install the heating tube. In order to ensure the installation and maintenance of the heating tubes, it is required that the heating tubes in the second liquid storage area 30 and the heating tubes in the first liquid storage area 20 are provided on the same end surface of the body 10. Of course, in the second liquid storage area 30, the heating tube may be installed on the mounting hole 22 when secondary heating is needed. While when secondary heating is not needed, it is only necessary to block the mounting hole 22, and the second liquid storage area 30 is still a closed area.

Since the secondary heating in the second liquid storage area 30 has a temperature range of not greater than that of the first heating in the first liquid storage area 20, the number of heating tubes in the second liquid storage area 30 is not greater than that in the first liquid storage area 20.

Further, in order to ensure that the installation positions of the heating tubes in the first liquid storage area 20 and the second liquid storage area 30 do not affect flowing of the solution, it is required that positions of all the heaters 21 are lower than a height of the partition 11. That is, both the position of the uppermost heating tube in the first liquid storage area 20 and the position of the uppermost heating tube in the second liquid storage area 30 are lower than the height of the partition 11, so as to prevent flowing of the solution from being affected. Meanwhile, the height of the partition 11 is lower than a height of a wall surface of the body 10 for safety of solution in the liquid storage tank 100.

Figure 3:
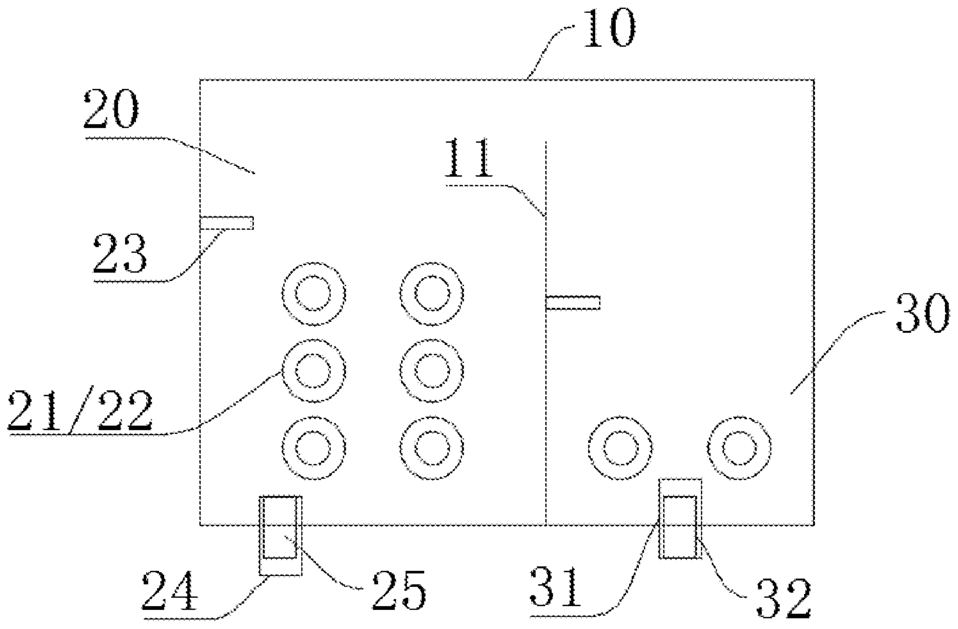
FIG. 3 is schematic cross-sectional view of a first liquid storage area and a second liquid storage area in the liquid storage tank.

Further, as shown in FIG. 3, liquid level controls 23 for monitoring the position of the solution are provided in both the first liquid storage area 20 and the second liquid storage area 30. The liquid level control 23 may be a monitoring floating ball or a liquid level sensor. A height of the position of the liquid level control 23 in the first liquid storage area 20 is higher than that of the uppermost heating tube in the first liquid storage area 20 and lower than a height of the position of the partition 11. Further, a height of the position of the liquid level control 23 in the second liquid storage area 30 is higher than that of the uppermost heating tube in the second liquid storage area 30 and lower than that of the partition 11. The purpose of this configuration is to prevent dry burning of all the heating tubes. Meanwhile, it can ensure that solution in the first liquid storage area 20 and the second liquid storage area 30 can be used continuously.

The liquid level control 23 in the first liquid storage area 20 is used to monitor position where where the solution can be heated, i.e., limit of a heatable liquid level in the first liquid storage area 20. When the liquid level control 23 in the first liquid storage area 20 is monitored to the position of the solution, it means that solution in the first liquid storage area 20 can be heated, and solution in the first liquid storage area 20 protects the heating tubes in the first liquid storage area 20. When it is lower than this position, all the heating tubes in the heater 21 cannot work, thus avoiding the case of dry burning of the heating tubes. Of course, a temperature monitoring meter is provided in the first liquid storage area 20 to monitor the stability of the temperature of solution in the first liquid storage area 20. If the temperature of solution is unqualified, an external controller will be notified to notify the heater 21 to heat the solution. If the temperature of the solution is qualified, the controller will notify the heater 21 to keep the temperature of the solution.

The liquid level control 23 in the second liquid storage area 30 is used to monitor whether spraying is possible, when the liquid level in the second liquid storage area 30 reaches the position of the liquid level control 23, an instruction for quick spraying can be provided; and when the liquid level in the second liquid storage area 30 has not reached the position of the liquid level control 23, it is necessary to continue to store water into the second liquid storage area 30. Meanwhile, in the second liquid storage area 30, the liquid level control 23 can also be used to monitor whether the secondary heating can be performed, that is, the heating tube in the second liquid storage area 30 can be controlled to heat the solution for a second time only when the liquid level in the second liquid storage area 30 exceeds the position of the liquid level control 23. When the liquid level is lower than the position of the liquid level control 23, the secondary heating cannot be performed. The height of the position of the liquid level control 23 in the second liquid storage area 30 is higher than that of the heating tube at the uppermost end in the second liquid storage area 30, which can also prevent the heating pipe from dry burning in the second liquid storage area 30.

Since the amount of solution in the first liquid storage area 20 is always greater than that in the second liquid storage area 30, it is required that the volume in the first liquid storage area 20 is greater than that in the second liquid storage area 30. In order to further ensure continuous circulation of solution in the first liquid storage area 20 and the second liquid storage area 30, it is required that the height of the liquid level control 23 in the first liquid storage area 20 is higher than that of the liquid level control 23 in the second liquid storage area 30.

Further, there is only one liquid inlet 24 in the whole liquid storage tank 100, and the liquid inlet 24 is provided only in the first liquid storage area 20. The first liquid storage area 20 is further provided with a first liquid outlet 25 for discharging solution. Both the liquid inlet 24 and the liquid outlet 25 are provided at a lower end surface of the body 10, so as to facilitate wiring arrangement. Meanwhile, the liquid outlet 25 is provided on the lower end surface of the body 10, which is beneficial to facilitate discharge of impurities in the first liquid storage area 20. The diameter of the liquid inlet 24 in the first liquid storage area 20 is larger than that of the liquid outlet 25 in the first liquid storage area 20. Since it is necessary to continuously store liquid in the first liquid storage area 20, and the first liquid storage area 20 is used only for heating the stored liquid, the liquid outlet 25 is used only when it is necessary to storage liquid.

Further, a second liquid outlet 31 for spraying and a are provided on a lower bottom surface of the second liquid storage area 30. In the inner cavity of the second liquid storage area 30, the height of the third liquid outlet 32 for overflowing is lower than that of the second liquid inlet 31 for spraying. The spraying time is short and the amount of water is large, while overflowing is continuous and has a slow flowing rate, when the liquid level is lower than the height of the second liquid outlet 31, liquid can not be sprayed from the second liquid storage area 30, and the remaining solution can continue to overflow without causing water-break. After the spraying, solution in the first liquid storage area 20 has begun to continue to flow into the second liquid storage area 30 through the partition 11, thus ensuring continuous overflow and intermittent spraying to clean the silicon wafers.

Figure 4:
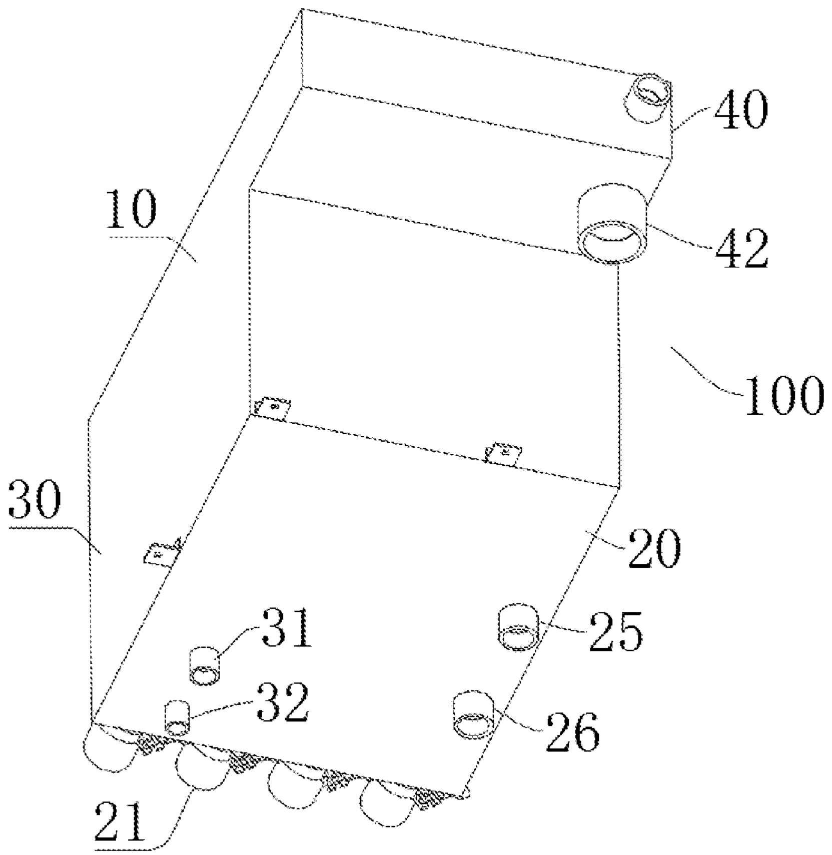
FIG. 4 is a rear perspective view of a liquid storage tank.

Further, as shown in FIG. 4, in order to prevent too much solution in the first liquid storage area 20 and the second liquid storage area 30 from overflowing from the body 10, a third liquid storage area 40 for storing mixed solution overflowed from the first liquid storage area 20 and the second liquid storage area 30 is provided at an end of the body 10 away from the heater 21. The third liquid storage area 40 merely serves as a transition area to discharge excess solution without storing any solution, so the height of the third liquid storage area 40 does not need to be set too high. It is only necessary to ensure that the upper end surface of the third liquid storage area 40 is flush with the upper end surface of the body 10, and the height of the third liquid storage area 40 is smaller than that of the first liquid storage area 20 and the second liquid storage area 30. The third liquid storage area 40 is provided across widths of the first liquid storage area 20 and the second liquid storage area 30, and is connected with the first liquid storage area 20 and the second liquid storage 30 through a connecting plate 41. The height of the connecting plate 41 is greater than that of the partition 11, so as to prevent solution in the third liquid storage area 40 from returning to the first liquid storage area 20 and the second liquid storage area 30.

Further, two fourth liquid outlets 42 are provided in the third liquid storage area 40, one of which is provided on a lower bottom surface of the third liquid storage area 40, and the other is provided on a side wall surface of the side away from the third liquid storage area 40, so as to ensure that once one fourth liquid outlet 42 is blocked, the other fourth liquid outlet 42 can continue to work.

In this embodiment, solution in the liquid storage tank 100 may be a medical solution or a pure water solution.

Figure 5:
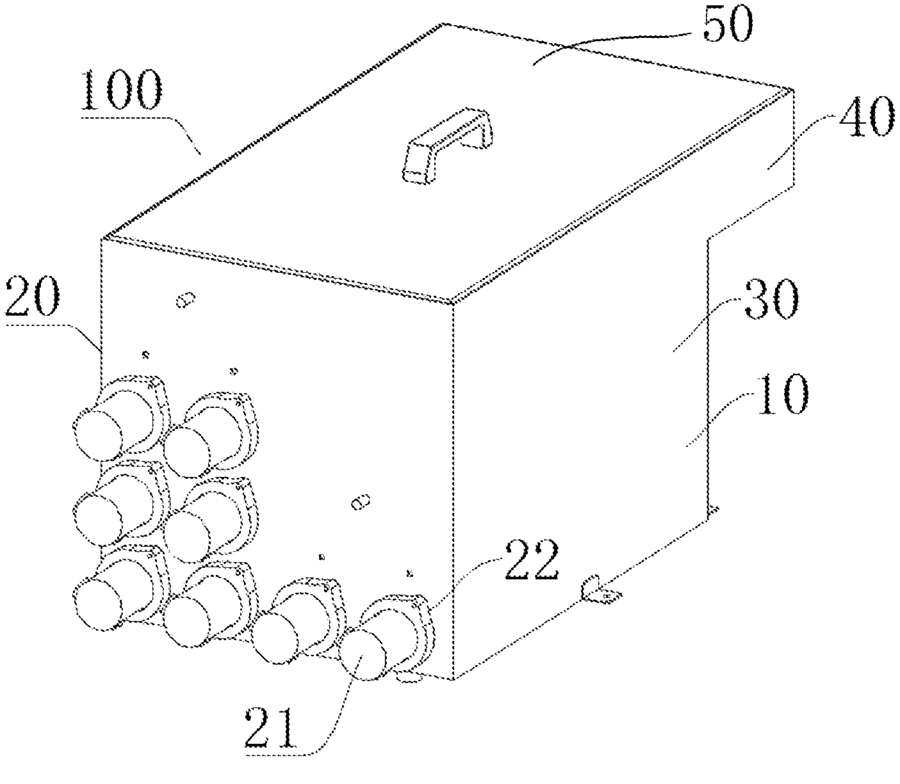
FIG. 5 is a perspective view of a liquid storage tank equipped with a cap according to another embodiment of the present disclosure.

As shown in FIG. 5, in another embodiment of the present disclosure, a cap 50 is also provided on the body 10 to ensure that the whole liquid storage tank 100 circulates in a closed space, thus preventing the solution from overflowing or leaking, avoiding waste of resources, improving the production efficiency, and reducing the production cost.

A cleaner equipped with the above mentioned liquid storage tank 100 is also provided.

According to the liquid storage tank designed by the present disclosure, heating and spraying are separately by adopting a mode of storing solution in different areas. Meanwhile, the structure of the second liquid storage area with a spraying function is improved to ensure continuous use of water during overflowing. Further, the solution in the second liquid storage area can be subjected to a secondary heating, thereby improving the cleaning quality. In addition, a third liquid storage area is added to prevent the liquid storage level from being too high to overflow the liquid storage tank. The present disclosure further provides a cleaner equipped with the liquid storage tank.

Some embodiments of the present disclosure have been described in detail above, but are not intended to limit the scope of the present disclosure. All equivalent changes and modifications made in accordance with the present disclosure shall still fall within the scope of the present disclosure.

What is claimed is:

1. A liquid storage tank, comprising a body with an inner cavity, wherein a first liquid storage area and a second liquid storage area are provided in the body, and a partition is provided between the first liquid storage area and the second liquid storage area;

wherein a first heater for heating solution is provided in the first liquid storage area;

wherein one or more liquid outlets are provided in the second liquid storage area;

wherein a third liquid storage area is further provided at an end of the body away from the first heater;

wherein the third liquid storage area is provided across respective widths of the first liquid storage area and the second liquid storage area, and is connected with the first liquid storage area and the second liquid storage through a connecting plate;

wherein a height of the connecting plate is higher than the height of the partition; and wherein a liquid outlet is provided on each of a lower bottom surface and a side wall surface of the third liquid storage area.

2. The liquid storage tank according to claim 1, wherein the first heater is arranged at an end of the first liquid storage area and inserted into the first liquid storage area.

3. The liquid storage tank according to claim 1, wherein a second heater is provided in the second liquid storage area, and the first heater and the second heater are arranged on a same end surface of the body.

4. The liquid storage tank according to claim 3, wherein the first heater comprises a plurality of first heating tubes, and the second heater comprises a plurality of second heating tubes more than the plurality of first heating tubes;

each of the first heater and the second heater is positioned lower than a height of the partition; and the height of the partition is lower than a height of a wall surface of the body.

5. The liquid storage tank according to claim 3, wherein a first liquid level control and a second liquid level control are provided respectively in the first liquid storage area and the second liquid storage area;

a height of the first liquid level control is higher than a height of the first heater and lower than a height of the partition; and a height of the second liquid level control is higher than a height of the second heater and lower than the height of the partition.

6. The liquid storage tank according to claim 5, wherein a first liquid inlet and a first liquid outlet are provided in the first liquid storage area and located at a lower end surface of the body, and a diameter of the first liquid inlet is larger than that of the first liquid outlet.

7. The liquid storage tank according to claim 1, wherein the one or more liquid outlets in the second liquid storage area comprise a second liquid outlet and a third liquid outlet each located on a lower bottom surface of the second liquid storage area; and a height of the second liquid outlet is lower than a height of the third liquid outlet in an inner cavity of the second liquid storage area.

8. The liquid storage tank according to claim 2, wherein a second heater is provided in the second liquid storage area, and the first heater and the second heater are arranged on a same end surface of the body.

9. The liquid storage tank according to claim 8, wherein a first liquid level control and a second liquid level control are provided respectively in the first liquid storage area and the second liquid storage area;

a height of the first liquid level control is higher than a height of the first heater and lower than a height of the partition; and a height of the second liquid level control is higher than a height of the second heater and lower than the height of the partition.

10. The liquid storage tank according to claim 4, wherein a first liquid level control and a second liquid level control are provided respectively in the first liquid storage area and the second liquid storage area;

a height of the first liquid level control is higher than a height of the first heater and lower than a height of the partition; and a height of the second liquid level control is higher than a height of the second heater and lower than the height of the partition.

11. The liquid storage tank according to claim 8, wherein the first heater comprises a plurality of first heating tubes, and the second heater comprises a plurality of second heating tubes more than the plurality of first heating tubes;

each of the first heater and the second heater is positioned lower than a height of the partition; and the height of the partition is lower than a height of a wall surface of the body.

12. The liquid storage tank according to claim 1, wherein a volume in the first liquid storage area is greater than a volume in the second liquid storage area.

13. The liquid storage tank according to claim 1, wherein the partition is provided along a length direction of the body.

14. The liquid storage tank according to claim 4, wherein a plurality of mounting holes are provided at one end of the body, and the plurality of mounting holes cooperate with the plurality of first heating tubes and the plurality of second heating tubes.

15. A cleaner provided with a liquid storage tank comprising a body with an inner cavity, wherein a first liquid storage area and a second liquid storage area are provided in the body, and a partition is provided between the first liquid storage area and the second liquid storage area;

wherein a first heater for heating solution is provided in the first liquid storage area;

wherein a liquid outlet is provided in the second liquid storage area;

wherein a third liquid storage area is further provided at an end of the body away from the first heater;

wherein the third liquid storage area is provided across respective widths of the first liquid storage area and the second liquid storage area, and is connected with the first liquid storage area and the second liquid storage through a connecting plate;

wherein a height of the connecting plate is higher than the height of the partition; and wherein a liquid outlet is provided on each of a lower bottom surface and a side wall surface of the third liquid storage area.

* * * * *